UNITED STATES PATENT OFFICE.

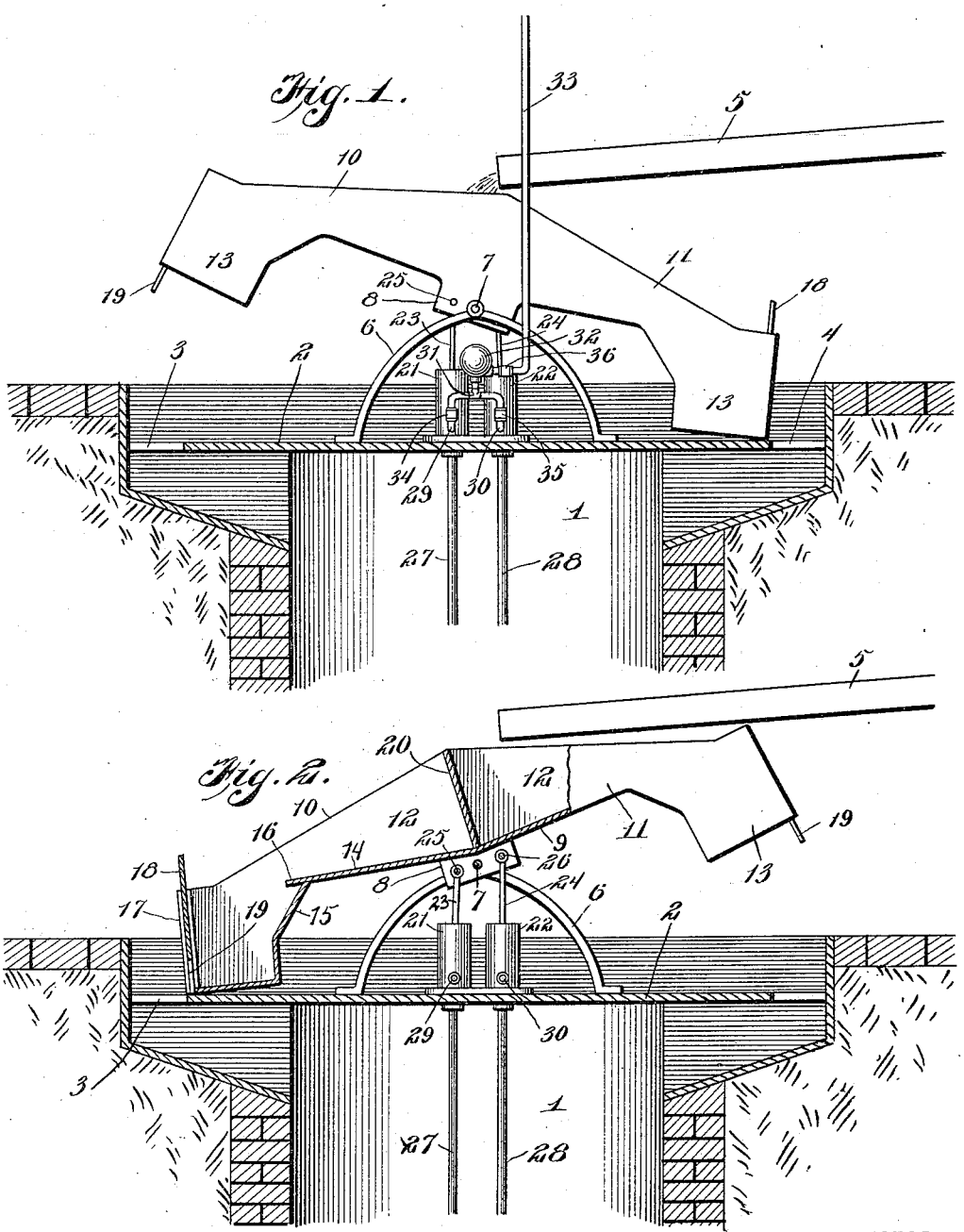

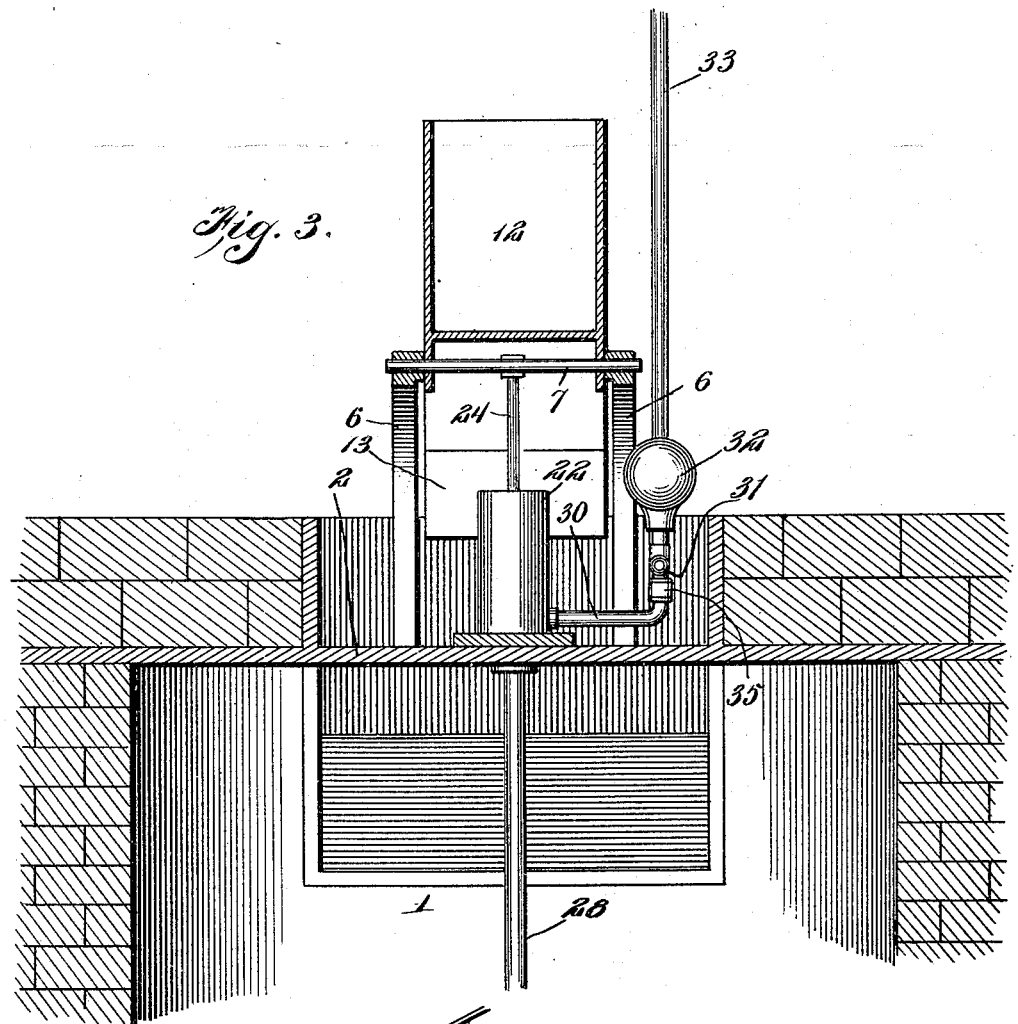
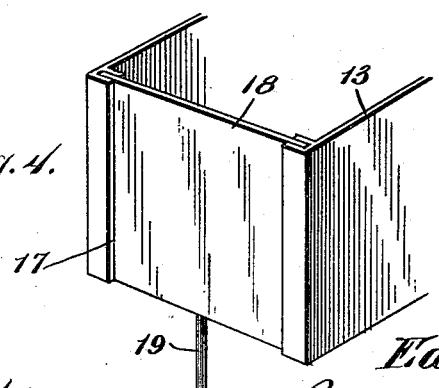

EDWARD L. PEISAR, OF GLENWOOD SPRINGS, COLORADO.

WATER-ELEVATING APPARATUS.

1,044,079.  Specification of Letters Patent.  Patented Nov. 12, 1912.

Application filed January 17, 1912. Serial No. 671,576.

*To all whom it may concern:*

Be it known that I, EDWARD L. PEISAR, a citizen of the United States, residing at Glenwood Springs, in the county of Garfield and State of Colorado, have invented certain new and useful Improvements in Water-Elevating Apparatus, of which the following is a specification.

This invention relates to a water elevating apparatus or pump for raising water from a source of supply to a higher level for domestic or other uses or for irrigating land which can not be irrigated by surface gravity in the usual way.
The primary object of the invention is to provide simple and effective pumping mechanism for raising water from a cistern or other reservoir to the desired elevation for service, which mechanism is adapted to be operated by the force of gravity of bodies of water obtained from a flowing source of supply.

A further object of the invention is to provide a duplex or double-acting pumping mechanism of this character, the pumping elements of which will be automatically and alternately operated by bodies of water from one and the same source of supply.

The invention consists of the features of construction, combination and arrangement of parts, hereinafter fully described and claimed, reference being had to the accompanying drawings, in which:—

Figure 1 is a side elevation of a pumping apparatus embodying my invention, the reservoir appearing in section and the walking-beam or lever at the limit of its working motion in one direction. Fig. 2 is a similar view with the walking-beam or lever shown partially in longitudinal section and at the limit of its opposite working motion. Fig. 3 is a vertical transverse section through the apparatus. Fig. 4 is a perspective view of one of the buckets and its gate or valve.
Referring to the drawings, 1 designates a cistern or reservoir having a depressed floor or platform 2 arranged within its mouth and provided with openings 3 and 4 for the flow of water to the body of said cistern. This or any other suitable type of reservoir may be employed. Above the mouth of the cistern or reservoir is arranged a flume or conductor 5 for supplying a stream of water from a suitable primary source.

Mounted upon the floor or platform 2 at a point midway between the openings 3 and 4 are spaced parallel brackets or standards 6 carrying a transverse pivot pin or bolt 7. Pivotally engaging this pin or bolt are spaced fulcrum plates 8 fixed to and depending from the center of a walking-beam or lever 9, which is thus mounted to rock or tilt in a vertical plane. The oppositely extending arms 10 and 11 of the walking-beam or lever are in the form of open-topped troughs or receptacles, each having an inner receiving chamber or compartment 12 and an outer discharge chamber, bucket or compartment 13. The bucket 13 depends below the bottom 14 of the chamber 12 and has the upper portion of its inner wall sloping upwardly and inwardly, as at 15, and projecting inwardly beneath the wall 14 to form a flaring entrance to the bucket, into which the outer end of said wall 14 partially extends in the form of a ledge or shelf 16. Each bracket is open at its outer end for the discharge of water therefrom and is provided with guideways 17. In these guideways is fitted to slide a gravity-closing gate or valve 18 provided with a depending contact pin 19 adapted on contact with the floor or platform 2 to force said gate or valve open. A transverse partition 20 is disposed between and separates the two chambers 12. The upper edges of the side walls of the arms 10 and 11 slope outward and downward, thus making each chamber 12 of maximum depth at its inner end.

Supported by the platform 2 is a pair of pump cylinders 21 and 22 the piston rods 23 and 24 of which are pivotally coupled to wrist-pins 25 and 26 and arranged on opposite sides of the fulcrum pin 7, whereby the pump pistons are adapted to be alternately operated on their suction and discharge strokes by the reverse rocking motions of the walking-beam or lever. The suction ports of the cylinders communicate with depending conducting pipes 27 and 28, while the outlets 29 and 30 of said cylinders are connected by a union 31 provided with an air-pressure chamber or head 32 communicating with a delivery or stand pipe 33 leading to the elevation to which the water is to be forced. Check valves 34, 35 and 36 are provided in the above-described connections for an obvious purpose.

The operation is as follows: Assuming that the walking-beam is in the position shown in Fig. 1, in which the bucket of arm 11 is in its discharge position and the piston in the two cylinders 21 and 22 respectively at the limits of their suction and discharge strokes, it will be seen that the chamber 12 of arm 10 is arranged to receive the water from the flume 5. When a sufficient quantity of water to overcome the weight of the arm 11 and the resistance of the pumps has run into said chamber 12 of the arm 10, the weight of the water will tilt the beam so as to depress the arm 10 and elevate the arm 11, the gate 18 of the arm 11 closing by gravity as said arm moves into receiving position, while the contact of pin 19 of the gate of arm 10 forces the latter-named gate open for discharge of the water from the bucket 13 of arm 10 through the opening 3 into the reservoir. On such downward movement of the arm 10 the water previously drawn through the pipe 27 into the pump cylinder 21 is forced out into the pipe 33, as will be readily understood, while on the upward movement of the arm 11 the piston in cylinder 22 will move on its suction stroke and draw water into said cylinder through pipe 28, ready for discharge into the pipe 33 on the succeeding downward movement of the arm 11. The tilting of the beam in the manner described will bring the parts into the position shown in Fig. 2, in which the arm 11 is brought into receiving position beneath the flume 5, the partition cutting off the flow of water into the arm 10, whereby when said arm 11 is depressed by the weight of the water the parts will again assume the position shown in Fig. 1, the water discharging from the bucket 13 of arm 11, while the pistons in the cylinders 21 and 23 respectively reach the limit of their suction and discharge strokes and the arm 10 is in position for a repetition of the operation before described. It will be observed that the construction of the chamber 12 of each arm when elevated insures the filling of said chamber with a body of water of sufficient weight to tilt the beam and depress said arm. Thus when the descending arm reaches a certain point in its descent the water will discharge forcibly from said chamber 12 over the shelf 16 into the communicating bucket 13, producing a rate of fall or impact which increases its motive power. As long as the flow of water from the flume continues, the beam will be tilted to alternately move the arms thereof into receiving and discharge positions, insuring a constant supply of water to the pipe 33 for distribution and use.

As set forth, the apparatus may be employed for raising water to an elevation for domestic use or other purposes, and it may be efficiently employed for elevating water for irrigating portions of land which cannot be irrigated by ordinary gravital flow from a main source of supply.

The apparatus may be thrown out of operation at any time by simply cutting off the flow of water from the flume, as will be readily understood, for which any suitable type of cut off may be employed.

It will be apparent that the apparatus is simple and inexpensive in construction and operation and may be used whenever a source of supply of flowing of water is available.

Having thus described the invention, what I claim as new is:—

1. A water elevating or pumping apparatus, comprising a reservoir, a water supply device having its discharge portion arranged above said reservoir, a centrally pivoted rocking beam or lever forming a trough having its arms provided by a central transverse partition and providing water compartments respectively diminishing in depth from said partition toward their outer ends, the inner ends of said compartments being arranged adjacent to said water supplying device so as to be alternately brought into receiving position beneath the same by the reverse tilting motions of the beam or lever, a bucket at the outer end of each compartment arranged below the plane of said compartment and having a flaring mouth and a discharge outlet, each compartment being provided with an inclined shelf at its base projecting partially into the flaring mouth of the communicating bucket, a gravity closing valve controlling said outlet and provided with a depending contact portion, and pumping mechanism actuated by the rocking motion of the lever.

2. A water elevating or pumping apparatus, comprising a reservoir, a water supply device having its discharge portion arranged above said reservoir, a centrally pivoted rocking beam or lever forming a trough having its arms provided by a central transverse partition and providing water compartments respectively diminishing in depth from said partition toward their outer ends, the inner ends of said compartments being arranged adjacent to said water supplying device so as to be alternately brought into receiving position beneath the same by the reverse tilting motions of the beam or lever, a bucket at the outer end of each compartment arranged below the plane of said compartment and having a flaring mouth and a discharge outlet, each compartment being provided with an inclined shelf at its base projecting partially into the flaring mouth of the communicating bucket, a gravity closing valve controlling said outlet and provided with a depending contact portion, wrist pins carried by the lever on opposite sides of its fulcrum, pump cylinders communicating with the reservoir, and piston rods connecting the pump pistons with the wrist pins.

In testimony whereof I affix my signature in presence of two witnesses.

EDWARD L. PEISAR.

Witnesses:
 Louis F. Nell,
 L. B. Hungerford.

Copies of this patent may be obtained for five cents each, by addressing the "Commissioner of Patents, Washington, D. C."